United States Patent [19]
Bevis et al.

[11] 3,827,072
[45] July 30, 1974

[54] CASSETTE

[75] Inventors: Paul A. Bevis, Pasadena; Hazen L. Hoyt, III, Glendora; Thomas E. Miner, Pasadena, all of Calif.; Norbert T. Kuypers, Lake Orion, Mich.

[73] Assignee: Xerox Corporation, Rochester, N.Y.

[22] Filed: Dec. 16, 1971

[21] Appl. No.: 208,973

Related U.S. Application Data
[63] Continuation of Ser. No. 874,747, Nov. 7, 1969.

[52] U.S. Cl............... 95/66, 95/89 R, 250/315 A, 355/72
[51] Int. Cl. ........................................ G03b 17/26
[58] Field of Search............. 95/66, 89 R; 355/72; 250/315 R, 315 A, 468, 470, 471, 475

[56] References Cited
UNITED STATES PATENTS

| | | | |
|---|---|---|---|
| 2,823,318 | 2/1958 | Gacki................................ | 95/66 |
| 2,878,389 | 3/1959 | Raffman........................... | 95/66 |
| 2,900,515 | 8/1959 | Criscuolo et al............... | 260/315 A |
| 2,928,324 | 3/1960 | Hardenberg..................... | 95/66 |
| 3,271,571 | 9/1966 | Klem, Jr. et al................. | 95/89 R |
| 3,364,835 | 1/1968 | Brackett et al.................. | 95/89 R |
| 3,559,554 | 2/1971 | Schmidt............................ | 95/89 R |

Primary Examiner—Fred L. Braun
Assistant Examiner—Russell E. Adams, Jr.

[57] ABSTRACT

This application relates to a cassette adapted for use in an automated, flat plate xerographic processing system, especially of the type wherein X-ray images are recorded. The cassette includes means to rigidly support a xerographic plate therein and means adapted for cooperation with external plate advancing means for the insertion and withdrawal of a xerographic plate. Upon closing of the cassette by one of the associated processing units and upon the withdrawal of the plate-bearing cassette therefrom, the xerographic plate therein is maintained in a light-tight environment. After imaging exposure to X-rays which readily pass through the cassette walls, the cassette is inserted into another automated processing unit which automatically opens the cassette and removes the plate, supported by the cassette in proper alignment, therefrom.

27 Claims, 6 Drawing Figures

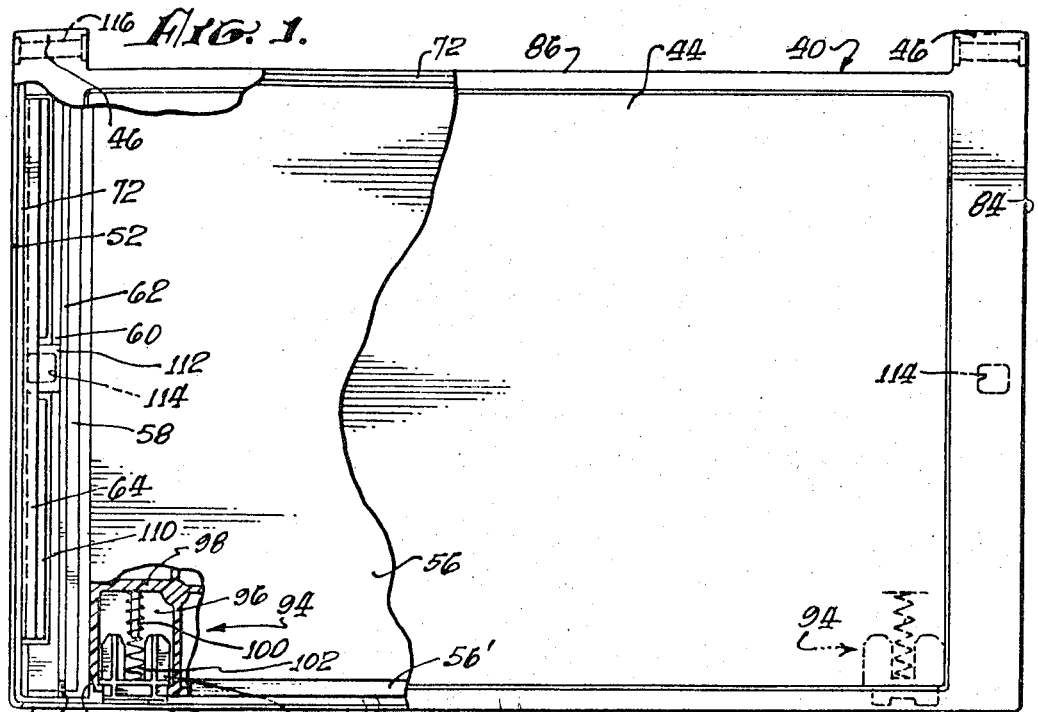
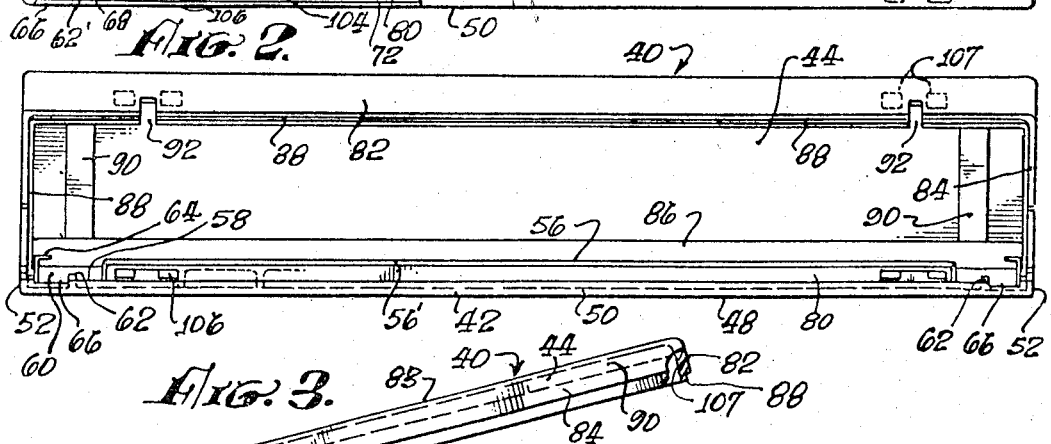
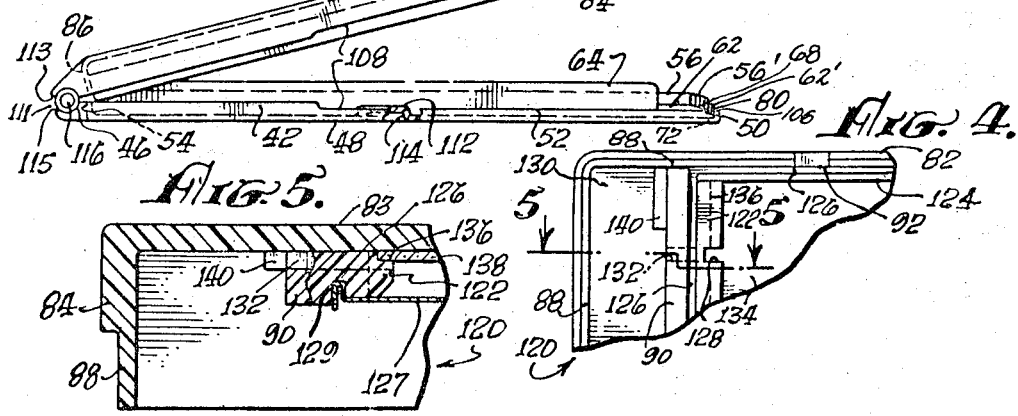

CASSETTE

This is a continuation, division, of application Ser. No. 874,747 filed Nov. 7, 1969.

BACKGROUND OF THE INVENTION

This application relates to a cassette suitable for use in an automated xerographic processing system adapted for use in the field of medical diagnostics. Specifically, the cassette is provided for the transportation of a xerographic plate from the charging apparatus through an external exposure station to the development apparatus, the xerographic plate being held in a light-tight environment such that the uniform electrostatic charge and/or the latent electrostatic image thereon is not adversely degraded by exposure to ambient, actinic radiation. The design of the cassette permits automated insertion and withdrawal of the xerographic plate by the associated components of the automated processing system.

In co-pending application Ser. No. 874,834, filed concurrently herewith and assigned to the assignee of the present invention, there is described an automated flat-plate xerographic processing system including charging means for placing a uniform electrostatic charge on the photo-conductive surface of a xerographic plate, means for holding a light-tight cassette into which the xerographic plate can be inserted, means for opening the cassette and for inserting the charged xerographic plate therein without exposing the charged plate to actinic electromagnetic radiation, means for receiving the xerographic plate-holding cassette after imaging exposure, the xerographic plate having thereon a latent electrostatic image suitable for subsequent development, means for opening the cassette and for withdrawing the latent electrostatic image-bearing xerographic plate from the cassette without further exposure of the xerographic plate to actinic electromagnetic radiation, means for developing the latent electrostatic image to form a reproduction thereof suitable for visual examination, and means for advancing the xerographic plate to the developing means without disturbing the latent electrostatic image thereon. In this system, exposure of the uniformly charged xerographic plate takes place outside of the xerographic processing apparatus. This feature enables the radiologist, when considering medical examinations, to selectively position a patient, and particularly those portions of the patient's body being examined, with respect to the radiation source and the xerographic plate. To permit such exposure outside the processing apparatus, the processing system described in the aforementioned co-pending application includes the light-tight cassette of the present invention into which the uniformly charged xerographic plate is inserted.

OBJECTS OF THE INVENTION

It is, therefore, the primary object of the present invention to provide a cassette suitable for use with the automated xeroradiographic processing system described above.

It is a further object of the present invention to provide a cassette which will be automatically opened upon insertion thereof into the associated components of the automated xeroradiographic processing system.

It is a further object of the present invention to provide a cassette which will receive a xerographic plate suited for transportation through the automated xeroradiographic processing apparatus described above.

It is a further object of the present invention to provide a cassette which, in combination with the automated xeroradiographic processing apparatus, will maintain the electrostatically charged xerographic plate in a light-tight environment during the insertion of the xerographic plate herein, the exposure of the xerographic plate to the image-forming radiation, and the withdrawal of the xerographic plate therefrom.

Still a further object of the present invention is to provide a cassette which protects the xerographic plate therein from inadvertent damage during manual movement of the plate-holdng cassette outside of the associated components of the automated xeroradiographic processing system described above.

Still a further object of the present invention is to provide a cassette top cover which supports a tightly stretched membrane close to, but spaced from, the photoconductive surface of a xerographic plate positioned within the cassette.

These and still further objects, features and advantages of the present invention will become apparent upon consideration of the following detailed disclosure.

BRIEF SUMMARY OF THE INVENTION

The above and still further objects of the present invention are achieved, in accordance therewith, by providing a cassette having a top cover rotatably hinged to a base member adjacent the rear walls thereof. The base member has an interior support surface raised above guide channels on either side thereof. The raised surface is adapted to support the lower surface of the conductive backing member of a xerographic plate inserted therein. The xerographic plate has side rails attached thereto which are notched, in a symmetrical manner, so that plate advancing means, external to the cassette, can insert the plate in, or withdraw the plate from, the cassette. The channels on each side of the raised support surface are adapted to receive the side rails attached to the respective sides of the xerographic plate whereby the plate is properly positioned within the cassette during the insertion operation. The base member also includes U- or L-shaped guide members which not only assist in the guidance of the xerographic plate into the proper position but also function to maintain the xerographic plate in its proper position should the cassette, with the plate herein, be inverted, either intentionally or accidentally. The shaped guide members do not extend completely from the rear wall of the base member to the front wall, rather they terminate at a position which permits access by the plate advancing means to the leading notches in the side rails whereby insertion and/or withdrawal of the xerographic plate can be achieved.

The top cover has appropriately positioned ridges which cooperate with ridges in the base member, adjacent the guide channels and below the xerographic plate, to additionally support the xerographic plate therein during manual inversion of the cassette.

A tongue depending from the top cover cooperates with a groove in the base member to define a light-tight environment adapted to prevent exposure of a xerographic plate therein to ambient electromagnetic radiation when the cassette is in the closed condition. Latch members are provided to lock the top cover to the base member when the cassette is closed. Only upon the intentional opening of the latch members, normally by the automated components of the xeroradiographic processing system, can the cassette be opened to insert or withdraw the xerographic plate therefrom. Thus, during the normal manual manipulation of the cassette when it is transported from the charging apparatus through the exposure station to the development station, the xerographic plate therein will be maintained in a light-tight environment adapted to prevent exposure of the charged, or latent-electrostatic image-bearing, xerographic plate to ambient, actinic electromagnetic radiation such as would degrade image quality.

The side walls of the top cover and the base member are grooved to define, on each side of the cassette, channels which cooperate with automated means, in the charging and printing units, to automatically open the cassette upon insertion therein. To further assist in the opening operations, notches are cut in the lower bottom wall of the base member which cooperate with means external thereto to lock the base member in the desired position during the insertion and/or withdrawal operations.

An optional top cover provides means for positioning a membrane in parallel, closely spaced relationship to the photoconductive surface of a xerographic plate therein. Inasmuch as an air space will be defined above the membrane (i.e., between the membrane and the interior surface of the top wall), there exists the possibility of ballooning of the membrane, and contact thereof with the charged photoconductive surface, due to compressive pressure on the top cover. Such contact might undesirably affect image quality. Accordingly, exit ports are provided through the membrane positioning means whereby trapped air above the membrane can be expelled from the air chamber when compressive pressure is applied to the top cover. This substantially eliminates ballooning of the membrane and the possibility of the adverse affect on image quality should direct contact result. A further option is the provision of a notch in the membrane positioning members (or the ridges in the top cover) for the insertion of a filter therein. This enables the modification of the imaging radiation before it reaches the charged xerographic plate. The notch, with the filter or absorptive medium therein, are so positioned as not to prevent the expulsion of air through the exit ports when the membrane and the filter are both positioned within the top cover of the cassette.

BRIEF DESCRIPTION OF THE DRAWINGS

The nature of the invention will be more easily understood when it is considered in conjunction with the accompanying drawings wherein:

FIG. 1 is a top plan view of the cassette of the present invention showing, in partial cutaway, one latch member and the guide members associated with the proper positioning of the xerographic plate within the cassette;

FIG. 2 is a front elevation view of the cassette of FIG. 1 showing the cassette in partially open condition ready for the insertion of a xerographic plate therein;

FIG. 3 is a side elevation of the cassette of FIG. 1 in its partially open position as depicted in FIG. 2 when considered from the left-hand side of the partially opened cassette.

FIG. 4 is a bottom fragmentary view of a portion of an optional top cover for the cassette of FIG. 1;

FIG. 5 is a cross-sectional view of the optional cover of FIG. 4 taken along line 5—5.

Referring to FIGS. 1–3, there is seen a cassette 40 into which the xerographic plate shown in FIGS. 1–3 of the aforementioned co-pending application, is inserted. Cassette 40 has a base 42 and a top cover 44 hinged together at the rear by hinges 46 which permit the opening and closing of the top cover so as to permit insertion and withdrawal of the xerographic plate. Hinges 46 are of conventional structure and design such that further description thereof is deemed unnecessary. Base 42 has a flat bottom wall 48, a front side wall 50, side walls 52 and a rear wall 54. Symmetrically positioned with respect to base 42 and extending above the vertical plane of the front, rear, and side walls is a surface 56 adapted to support the lower surface of a xerographic plate inserted into the cassette. Adjacent each side of raised support surface 56 are innermost channels 58 separated from outermost channels 60 by ridges 62. Ridges 62 and the front portion of surface 56 are slightly beveled, as at 62' and 56', to reduce the possibility of a plate jamming as it is inserted into the cassette. Along the outside edge of each outermost channel 60 is an L- or U- shaped support rail 64. Notches 66 in front wall 50, beveled portions 56' and 62' and angled portion 68 at the front of support surface 56 adjacent innermost channels 58 serve to properly position the xerographic plate as it is inserted into cassette 40 by plate advancing means (not shown). Ridges 62 cooperate with the flat portions on the bottom side of the side rails to support, in conjunction with surface 56, the xerographic plate in its proper position in the cassette when the base member is positioned below the top cover (i.e., as shown). Support rails 64 do not extend completely from the rear wall of base 42 to the front wall. Rather they terminate at a point which exposes the notch on each side rail adjacent the trailing edge of the xerographic plate so plate advancing means can cooperate therewith for appropriate plate movement. Around the inside perimeter of base 42, as defined in part by walls 50, 52, and 54, there is a groove 72 adapted to cooperate with a tongue 88 on top cover 44 which, when properly closed and seated together, define a light-tight environment adapted to prevent exposure of a xerographic plate therein to ambient electromagnetic radiation. Interior wall portions are also provided to further define groove 72 into which tongue 88 is seated to maintain the desired dark environment.

Figure 6:
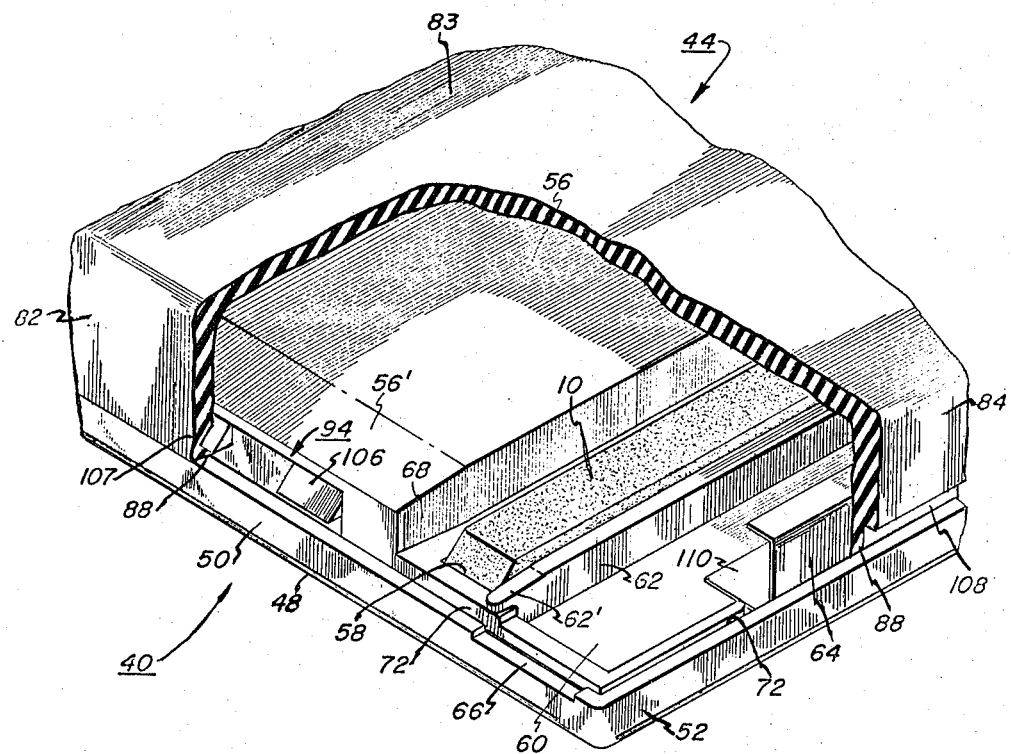
FIG. 6 is an enlarged fragmentary perspective view, partially broken away, of the front corner of the cassette viewed from the right side of FIG. 1.

The cassette will be substantially in the position as shown in FIGS. 2 and 3 when it is inserted into the charging unit, i.e., when the uniformly charged plate is automatically inserted into the cassette. After exposure, to insert the cassette into the printing unit, it is necessary that the cassette be inverted whereby base member 42 will be on top. In this position, support rail 64 serves its primary function of maintaining the plate in proper vertical alignment with the plate path associated with the automated plate advancing mechanism.

When the cassette with the xerographic plate therein is inverted, the portions of the side rails of the xerographic plate (which were initially the upper surfaces but, because of cassette inversion, are now the lower surfaces) will seat against the horizontally extending portions of support rail 64 remote from bottom wall 48, such that the xerographic plate will be supported thereby in a horizontal plane. The plate advancing means will then automatically cooperate with the notches in the side rails to withdraw the plate from the cassette and transport it toward the developing unit.

Top cover 44 has front wall 82, top wall 83, side walls 84 and rear wall 86. Depending downwardly from walls 82, 84 and 86, is a tongue 88 adapted to cooperate with groove 72 in base 42 to provide, as indicated above, a light-tight environment when the top cover 44 is in the closed position. To permit proper alignment between tongue 88 and groove 72, and to provide flush surfaces defined by the outside walls of the base and the top cover when the cassette is in the closed position, tongue 88 is recessed slightly from walls 82, 84 and 86 toward the interior of the top cover. The width of groove 72 adjacent the rear wall 54 of base 42 and/or the thickness of that portion of tongue 88 adjacent back wall 86 of top cover 44 are so chosen as to permit the opening of the cassette, and particularly the top cover thereof, about hinges 46. Extending from the interior side of front wall 82 to the interior side of rear wall 86 are downwardly depending ridges 90 adapted to seat against the upper portion of the side rails on the xerographic plate and that portion of the upper surface of the conductive backing member adjacent thereto. An interference fit results which assists in securely maintaining the xerographic plate in the desired position within the cassette, especially when the plate-holding cassette is in the closed condition outside the automated processing units.

Front wall 82 of top cover 44 and that portion of tongue 88 depending therefrom has two notches 92 positioned therein in front of latch members 94 situated in front wall 80 of support surface 56. Each latch, as shown in the cutaway portion, has a chamber 96 in which the latch mechanisms reside. Secured to back wall 98 of chamber 96 is a pin 100 about which there is wound a coiled spring member 102. Spring 102 normally urges movable latch member 104 toward front wall 80 of support surface 56. In its fully extended position fingers 106 on member 104 seat against interior grooves 107 in front wall 82, as can best be seen in FIG. 3. When in the fully extended position, the meshing of fingers 106 and interior grooves 107 maintain the top cover in a locked position and prevent the cassette from being opened. Fingers on cassette opening means when inserted through notches 92 depress movable latch members 104 from their forward position and permit top cover 44 to be rotated into the open position, whereby a xerographic plate can be inserted therein or, if a plate is already therein, it can be withdrawn therefrom.

Side walls 52 in base 42 and side walls 84 in top cover 44 are notched to define channels 108 when the cassette is in the closed position. Channels 108 are adapted to cooperate with cassette opening means whereby the cassette will be properly positioned with respect thereto and opened to insert and/or remove a xerographic plate therefrom. Such mechanisms and the manner in which they cooperate with the cassette inserted therein are described in greater detail in said co-pending application.

As can best be seen in FIG. 3, hinge 46 has a space 111 between cooperating surfaces 113 and 115 which defines the angular opening through which top cover 44 can be rotated about pin 116. The spacing can be selected to provide the degree of angular opening desired.

The flat bottom portion 110 of each guide rail 64 is interrupted in the central portion thereof by upwardly extending boss 112 which has a rectangular notch 114 cut into the bottom portion thereof through bottom wall 48. As the cassette is inserted into either of the automated processing units described in co-pending application Ser. No. 874,834 referred to above cooperating edges of the cassette opening means slide into channels 108. Continued insertion of the cassette causes the top cover to come in contact with cassette opening means, and the latch members 104 with latch opening means, whereby further continued movement will cause opening of the top cover. At or near the end of the insertion movement, external means cooperate with notches 114 to lock the cassette in the proper position for plate insertion or withdrawal.

Referring to FIGS. 4 and 5, there is seen a portion of the operative portion of the inside of an optional top cover 120 suitable for use with base 42 described in FIGS. 1–3. Interior of downwardly depending ridges 90 but closely spaced thereto are channel-defining members 122. interior to front wall 82 and rear wall 86 and also closely spaced thereto are further channel-defining members 124. Members 122 and ridges 90, and members 124 and walls 82 and 86, define a spline channel 126 therebetween. It is the function of this channel to permit the positioning of a membrane 127, such as cloth or plastic film, over the lower surfaces of members 122 and 124 for the purpose of preventing ionic degradation during xeroradiographic imaging. The membrane is stretched over the lower surfaces of members 122 and 124 and secured thereto by positioning a spline 129 over the membrane above spline channel 126 and then forcing the spline and the underlining membrane into the spline channel.

Notches 128 are cut into members 122 at various positions along the length thereof. From notches 128 to channels 130 on the opposite side of ridge 90 from members 122, holes 132 are drilled to permit the expulsion of air from the air chamber defined by interior top wall portion 134 of top 120, members 122 and 124, and the membrane 127 securely positioned thereto. Since, in the xerographic processing system herein described, it is expected that the latent electrostatic image-bearing plate will be manually handled after exposure, but before image development, it can also be expected that pressure will be exerted upon the top cover 44 of the cassette. Such pressure can result, for example, during positioning of that portion of the patient's body undergoing examination or by a technician during manual transportation of the cassette to and from the exposure station. This downward pressure will cause a ballooning of the stretched membrane which may function to disturb the latent electrostatic image should direct contact result. This ballooning can be prevented by permitting the trapped air above the membrane to be expelled from the air chamber when compressive pressure is applied to the top cover. This is achieved by providing holes 132 through which air can escape from above the membrane when pressure is applied to the top cover, as described above.

As a further optional item, there is provided a notch 136 under the interior portions of members 122 into which there can be inserted a filter 138 adapted to modify the imaging radiation before it reaches the charged xerographic plate. When in position the filter should not cover the entrance port on the near side of holes 132 so as to prevent the expulsion of air should pressure be applied to the top wall of cover 44.

A plurality of members 140 can be provided for the purpose of locating the position in which ridges 90 are to be secured to the top cover of the cassette.

The manner in which the cassette of present invention is utilized, and the automated opening and closing mechanisms associated with such operations, are described in detail in co-pending application Ser. No. 874,834, filed concurrently herewith. Reference is made thereto for said complete discussion. Portions of said co-pending application which are necessary for a complete understanding of the present invention, or to provide sufficient disclosure to understand the overall cooperation of the cassette of the present invention and the automated opening and closing apparatus operable therewith, are incorporated herein by reference.

After a xerographic plate has been inserted into the cassette by means described in the aforementioned co-pending application, the cassette is automatically released from its holding means. In this operation, the cassette jumps back a short distance during which the top cover of the cassette is automatically lowered into the closed and locked position. Since the inserted xerographic plate, before the cassette is released, is merely supported by the contacting portions of base member 42, it was found that the inertia of the plate limited its movement, during the cassette release operation, to a distance less than the distance moved by the cassette. This resulted in the trailing edge of the plate extending into the opening between the top cover and the base member thereby blocking the movement of the top cover toward the closed and locked position. This has been overcome by positioning a material having a sufficiently high coefficient of friction, such as sponge rubber, in each of channels 58. The intimate contact of the underside of the xerographic plate with the slip-retarding material serves to maintain the xerographic plate in its inserted position as the cassette is automatically released. The plate no longer blocks the movement of the top cover whereby the top cover can properly seat and lock with the base member. The cassette, with the xerographic plate therein, will, accordingly, be in the desired condition, suitable for manual transporation outside of the automated processing units.

The base member and the top cover of the cassette can be constructed from organic resinous materials, such as the polycarbonate "Lexan" and the phenylene oxide related "Noryl," both resins being products of the General Electric Company. In general, the construction materials should be capable of being molded in thin sections to provide a strong, abrasion and impact resistant, rigid article suitable for the protection of the photoconductive layer on a xerographic plate inserted in the finished cassette. The resinous material must be opaque or must accept sufficient coloring material to be opaque to electromagnetic radiation, other than X-rays. If the resinous material is made opaque by the addition thereto of coloring material, the resultant mixture should be sufficiently homogenous so as not to present differential absorbing areas through which exposure to imaging radiation is made. Additionally, the material must be of limited absorptivity so that imaging radiation is not undesirably absorbed in the top cover. Finally, since the cassette is expected to be used in a medical diagnostic environment, it should be sufficiently chemically inert to withstand chemical sterilization, such as with iso-propyl alcohol.

While the invention has been described with reference to specific embodiments thereof, it will be understood by those skilled in the art that various changes may be made and equivalents may be substituted for elements thereof without departing from the true spirit and scope of the invention. In addition, many modifications may be made to adapt a particular situation, material or structural design, to the spirit of the present invention without departing from its essential teachings.

What is claimed is:

1. A cassette adapted to receive a xerographic plate having a conductive backing member, a downwardly depending side rail attached to each lateral side of said backing member, and a photoconductive layer on one surface of said backing member; said cassette comprising a base member; a top cover hinged to said base member about the rear walls thereof for rotational movement between an open position and a closed position; said base member having an interiorly positioned support surface elevated at least slightly above the front wall of said base member, said elevated surface adapted to support the lower, middle portion of a xerographic plate inserted therein when said base member is positioned below said top cover, at least one guide channel on each side of said elevated support surface, each of said guide channels being adapted to receive the side rail attached to the adjacent lateral side of the xerographic plate as the plate is inserted into the cassette, a shaped support member secured to said base member on the opposite side of each guide channel from said elevated support surface for supporting the xerographic plate in its proper position when the cassette is inverted such that the base member is positioned above said top cover; and means associated with said base member and said top cover for rigidly supporting a xerographic plate in the cassette without contacting the photoconductive layer when said top cover is in the closed position.

2. The cassette of claim 1 further including a groove positioned within the exterior walls of said base member and a tongue depending downwardly from the exterior walls of said top cover, said tongue fitting into said groove when said cassette is closed whereby a xerographic plate therein is maintained in a light-tight environment.

3. The cassette of claim 1 wherein the side walls of said top cover and base member are partially grooved to define channels therein which cooperate with means external to said cassette for the opening thereof.

4. The cassette of claim 1 further including movable latch means for maintaining said cassette in a closed condition.

5. The cassette of claim 1 further including movable latch means disposed interiorly of said elevated support surface, said movable latch means cooperating with ridges in the interior side of the front wall of said top cover for locking the top cover of the cassette in the closed position.

6. The cassette of claim 5 wherein the front wall of said top cover has a notch therein positioned opposite each of said movable latch means when said top cover is in the closed position, each notch enabling external means to have access to each of said latch means whereby, when said latch means are depressed, said top cover may be rotated into the open position.

7. The cassette of claim 1 wherein there is a ridge member between said elevated support surface and the guide channel on each side thereof, said top cover having downwardly depending ridge members immediately above the ridge members associated with said base member; said top cover ridge members and said base member ridge members cooperating to rigidly support a xerographic plate in the cassette when said top cover is in the closed position.

8. The cassette of claim 7 wherein there are two guide channels on each side of said elevated support surface, said guide channels on each side being separated by one of said base member ridge members.

9. The cassette of claim 1 wherein the guide channels most adjacent to said elevated support surface on each side thereof have a slip-retarding material therein, said material adapted to assist in maintaining a xerographic plate totally within the cassette as the cassette is partially ejected from an automated processing unit associated therewith.

10. The cassette of claim 1 wherein said base member has a bottom wall, said bottom wall having notches positioned therein and adapted for cooperation with means external thereto for locking the cassette in position in an associated automated processing unit when a xerographic plate is to be inserted therein or withdrawn therefrom.

11. The cassette of claim 1 wherein said shaped support rails do not extend completely to the front wall of said base member, whereby access may be had to the notches in the side members attached to the lateral sides of a xerographic plate inserted in the cassette.

12. The cassette of claim 1 wherein said top cover includes means for positioning a non-differentially absorbing membrane in parallel. Closely spaced relationship to the photoconductive layer of a xerographic plate within the cassette.

13. The cassette of claim 12 wherein said membrane positioning means include means to permit the expulsion of air from the air space between said membrane and the interior surface of the top wall of said top cover when compressive pressure is applied to the outside surface of said top wall of said top cover.

14. The cassette of claim 1 with further including spline channel-defining members positioned in said top cover adjacent said downwardly depending ridge members, and the front and rear walls of said top cover, whereby there is defined a spline channel for positioning a non-differentially absorbing membrane in parallel, closely spaced relationship to the photoconductive layer on a xerographic plate within the cassette.

15. The cassette of claim 14 wherein said membrane positioning means include means to permit the expulsion of air from the air space between said membrane and the interior surface of the top wall of said top cover when compressive pressure is applied to the outside surface of said top wall of said top cover.

16. The cassette of claim 1 further including means associated with external side walls of said cassette for the opening of said cassette by the cooperation thereof with means external to said cassette.

17. The cassette of claim 1 further including at least one groove in the exterior surfaces of said side walls on each side of said cassette, said grooves cooperating with means external to said cassette for the opening and closing thereof whereby a xerographic plate can be inserted therein and said cassette can be closed to maintain said inserted xerographic plate in a light-tight environment.

18. A cassette adapted to receive a xerographic plate having a conductive backing member, a downwardly depending side rail attached to each lateral side of said backing member, and a photoconductive layer on one surface of said backing member; said cassette comprising a base member; a top cover hinged to said base member about the rear walls thereof for rotational movement between an open position and a closed position; a guide member on each side of said cassette base member, each of said guide members being adapted to receive the side rail attached to the adjacent lateral side of the xerographic plate as the plate is inserted into the cassette, a shaped support member secured to said base member on the opposite side of each guide member for supporting the xerographic plate in its proper position when the cassette is inverted such that the base member is positioned above said top cover; and means associated with said base member and said top cover for rigidly supporting a xerographic plate in the cassette without contacting the photoconductive layer when said top cover is in the closed position.

19. The cassette of claim 18 further including a groove positioned within the exterior walls of said base member and a tongue depending downwardly from the exterior walls of said top cover, said tongue fitting into said groove when said cassette is closed whereby a xerographic plate therein is maintained in a light-tight environment.

20. The cassette of claim 18 wherein the side walls of said top cover and said base member are partially grooved to define channels therein which cooperate with means external to said cassette for the opening thereof.

21. The cassette of claim 18 further including movable latch means for maintaining said cassette in a closed condition.

22. The cassette of claim 18 further including movable latch means disposed adjacent said groove positioned within the exterior walls of said base member, said movable latch means cooperating with ridges in the interior side of the front wall of said top cover for locking the top cover of the cassette in the closed position.

23. The cassette of claim 18 further including a slip-retarding material positioned beside said side guide members, said material adapted to assist in maintaining a xerographic plate totally within the cassette as the cassette is partially ejected from an automated processing unit associated therewith.

24. The cassette of claim 18 wherein said base member has a bottom wall, said bottom wall having notch means positioned therein and adapted for cooperation with means external thereto for locking the cassette in position in an associated automated processing unit when a xerographic plate is to be inserted therein or withdrawn therefrom.

25. The cassette of claim 18 wherein said shaped support members do not extend completely to the front wall of said base member, whereby access may be had to the notches in the side rails attached to the lateral sides of a xerographic plate inserted in the cassette.

26. The cassette of claim 18 further including means associated with external side walls of said cassette for the opening of said cassette by the cooperation thereof with means external to said cassette.

27. The cassette of claim 18 further including at least one groove in the exterior surfaces of said side walls on each side of said cassette, said grooves cooperating with means external to said cassette for the opening and closing thereof whereby a xerographic plate can be inserted therein and said cassette can be closed to maintain said inserted xerographic plate in a light-tight environment.

* * * * *

UNITED STATES PATENT OFFICE
CERTIFICATE OF CORRECTION

Patent No. 3,827,072      Dated July 30, 1974

Inventor(s) Paul A. Bevis et al

It is certified that error appears in the above-identified patent and that said Letters Patent are hereby corrected as shown below:

In column 9, line 39, delete "rails" and insert --members-- therefor; on line 45, delete ". Closely" and insert --, closely-- therefor.

Signed and sealed this 19th day of November 1974.

(SEAL)
Attest:

McCOY M. GIBSON JR.
Attesting Officer

C. MARSHALL DANN
Commissioner of Patents